United States Patent

Westerman

[15] 3,704,430
[45] Nov. 28, 1972

[54] STARTING CIRCUIT FOR LOW VOLTAGE INVERTERS UTILIZING REGENERATIVE ACTION IN THE FEEDBACK TRANSFORMER OF THE INVERTER TO GENERATE STARTING SIGNALS

[72] Inventor: George Raymond Westerman, Denville, N.J.

[73] Assignee: Bell Telephone Laboratories, Incorporated, Murray Hill, N.J.

[22] Filed: June 23, 1971

[21] Appl. No.: 155,710

[52] U.S. Cl. .............................. 331/113 A, 331/112
[51] Int. Cl. .............................................. H02m 7/52
[58] Field of Search ....................................... 331/113

[56] References Cited
UNITED STATES PATENTS 3,085,211  4/1963  Jensen et al. ............ 331/113.1

Primary Examiner—John Kominski
Attorney—R. J. Guenther et al.

[57] ABSTRACT

A starting circuit for a low input voltage current feedback type inverter utilizes regenerative action in the windings of its feedback transformer to drive a transistor in order to generate starting oscillatory signals. These starting oscillatory signals are utilized to drive one of the switching transistors of the inverter into a conduction state, whereupon inverter action is started. An inhibiting feedback arrangement inhibits the starting oscillatory signals after the inverter circuit starts to oscillate.

1 Claim, 2 Drawing Figures

PATENTED NOV 28 1972

3,704,430

INVENTOR
G. R. WESTERMAN
BY Alfred G. Steinmetz
ATTORNEY

ST ARTING CIRCUIT FOR LOW VOLTAGE
INVERTERS UTILIZING REGENERATIVE ACTION
IN THE FEEDBACK TRANSFORMER OF THE
INVERTER TO GENERATE STARTING SIGNALS

BACKGROUND OF THE INVENTION

This invention relates to inverter starting circuits and, more particularly, to starting circuits to start current feedback type inverter circuits which are energized by a low voltage source.

The starting of an inverter circuit without a starting circuit normally depends upon some slight circuit imbalance between the two switching devices of the inverter. This imbalance normally occurs due to individual variations in the characteristics of the two switching devices. This imbalance induces conduction in one of the switching devices when power is applied and hence starts the inverter oscillating. The imbalance starting method is not suitable in inverters powered by a low voltage source since initial conduction in one of the switching devices cannot be depended upon with any degree of reliability.

In typical inverter applications requiring a high degree of reliability, the inverter circuit normally includes special circuitry to insure its starting upon application of the input power. One common starting circuit arrangement utilizes a starting resistor to initiate a current flow upon application of the input power. This current is utilized to bias one of the switching transistors into conduction. This starting arrangement is undesirable because the resistor dissipates power continuously and is a constant drain on the input power source. It is desirable, therefore, to include circuitry to switch the resistor out of the operating inverter circuit after the inverter has started to oscillate. This converts a simple starting resistor into a complex starting circuit.

Another commonly used starting circuit arrangement utilizes a voltage breakdown device to generate an initial starting pulse in response to the application of input power. This starting arrangement does not continuously dissipate power and drain the input power source. The low voltage of a low voltage source may be insufficient, however, to induce breakdown in the breakdown device. In addition, if the inverter fails to start with the first pulse generated by the breakdown device, the input power must be removed and reapplied again to activate the starting circuit. Resistive type starting circuits and breakdown devices are generally not suitable for starting inverters which operate from a very low supply voltage.

Some starting circuits for starting low voltage inverters utilize a separate starting oscillator which is independent of the inverter circuit. This oscillator is utilized to apply a train of pulses to the base of one of a pair of switching transistors in order to turn it ON and initiate oscillations in the inverter circuit. These oscillators frequently comprise blocking oscillator circuits which can operate from the same low voltage source used to power the inverter circuit. The blocking oscillator starting circuit, however, has the disadvantage of requiring a separate transformer and a complex inhibiting circuit to stop oscillations in the blocking oscillator once the inverter has started to oscillate.

It is therefore an object of the invention to initiate starting oscillations in a low voltage powered inverter with a minimum number of additional components added to comprise the starting circuit.

It is another object of the invention to inhibit the operation of the starting circuit once the inverter has started to oscillate.

It is yet another object of the invention to generate a series of starting pulses upon application of low voltage input power to an inverter circuit without the necessity of a separate blocking oscillator transformer.

BRIEF SUMMARY OF THE INVENTION

Therefore, in accord with the invention, an additional switching device, such as a transistor, is included in the inverter circuit and regeneratively connected to the feedback transformer of the inverter in a blocking oscillator arrangement. The blocking oscillator oscillates in response to the application of input power to the inverter circuit. These oscillations bias one of the switching devices of the inverter into conduction, whereupon the inverter starts to oscillate. After the inverter has begun to oscillate, a feedback signal is generated to inhibit the oscillatory action of the blocking oscillator. The blocking oscillator circuit and the inverter circuit are arranged to utilize the existing feedback transformer of the inverter circuit as the blocking oscillator transformer.

BRIEF DESCRIPTION OF THE DRAWINGS

The details and an understanding of the invention, together with additional objects and advantages, may be readily obtained from the following detailed description given in connection with the accompanying drawing in which.

DETAILED DESCRIPTION

Figure 1:
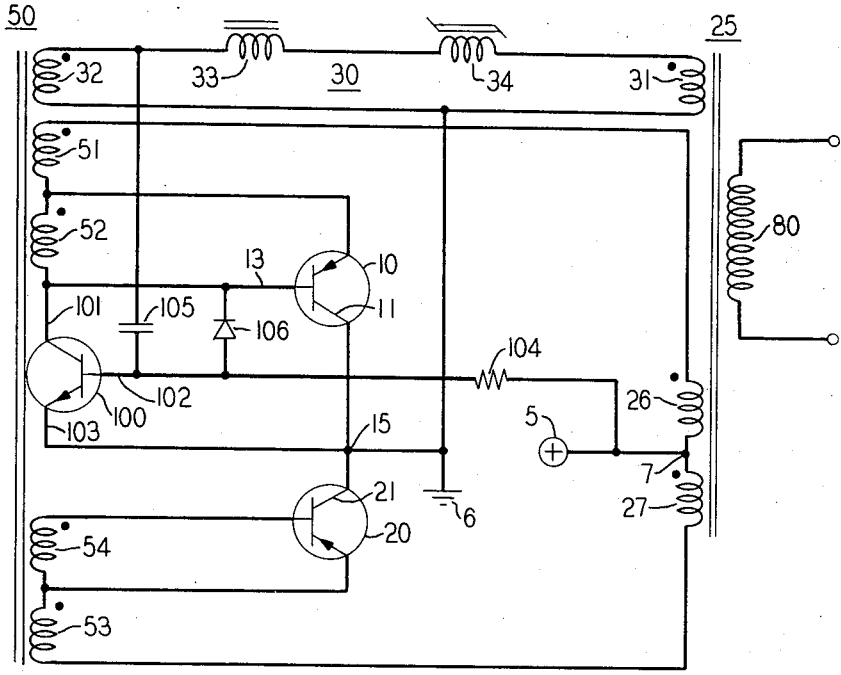
FIG. 1 shows a schematic of a common collector connected transistorized inverter having current feedback and energized by a low voltage source which, according to the invention, includes a starting circuit connected as a blocking oscillator within the inverter circuit.

The inverter circuit shown in FIG. 1 is a current feedback type inverter circuit which is designed to operate powered by a low voltage source. The inverter circuit comprises two switching transistors 10 and 20 having their respective collectors 11 and 21 connected to a common node 15 which is grounded. The inverter circuit includes an output transformer 25 and a feedback transformer 50. Both transformers preferably have a conventional rounded loop hysteresis characteristic and hence do not readily saturate under normal operation of the inverter. A negative feedback frequency determining network 30 has a winding 31 coupled to the transformer 25 and a winding 32 coupled to the transformer 50. A series connected linear inductor 33 and a saturable inductor 34 interconnect the two transformer windings 31 and 32.

The inverter circuit includes two output windings 26 and 27 connected to each other at node 7. A positive voltage source 5 is connected to node 7. The output winding 26 is connected to the feedback winding 51 of the feedback transformer 50. Winding 51 is connected in series to the bias winding 52. The output winding 27 is connected to the feedback winding 53 which is connected in series with the bias winding 54. The bias winding 52 shunts the emitter-base junction of the switching transistor 10 and controls the bias of transistor 10. The bias winding 54 shunts the emitter-base junction of the switching transistor 20 and controls its bias. The orientation of the above-described windings is indicated by the dot notation included in FIG. 1.

The operation of the above-described inverter circuit is conventional. The conduction of transistor 10 completes a circuit from the positive potential source 5 at node 7 through the winding 26 and winding 51 and through transistor 10 to ground. The flow of current is this path induces a voltage in the windings 27 and 31 and in the load winding 80. The switching of the switching transistor 10 is controlled by the base drive current induced in the bias winding 52 due to current feedback from current passing through the feedback winding 51. The base drive current due to this feedback drives the transistor 10 into a saturation state.

A voltage is induced in winding 31 from the output signal by the transformer action of transformer 25. The voltage induced in winding 31 appears across the saturable inductor 34 which, after a period of time determined by the characteristics of inductor 34 and the voltage across it, drives the magnetic core of inductor 34 into saturation. The current flow in the frequency determining loop 30 at this point assumes a maximum value. When this occurs, the voltage across winding 32 reverses its direction and the induced voltage in winding 52 biases the transistor 10 to a cut-off state. Transistor 20 at this point switches into conduction and a similar cycle of operation is repeated. Due to the low voltage of the voltage source 5 applied to node 7, starting of this inverter circuit due to the imbalance of device characteristics is not reliable.

The starting of this inverter circuit, according to the invention, is initiated by the signal output of an oscillatory starting circuit. The starting circuit comprises a blocking oscillator which includes the blocking oscillator transistor 100. The output of the blocking oscillator transistor 100 at collector 101 is applied to the base 13 of the switching transistor 10 and its oscillations turn transistor 10 ON in order to start the inverter circuit oscillating. Once the inverter circuit has started oscillating, a feedback signal renders the blocking oscillator inoperative.

The blocking oscillator transistor 100 has its collector 101 connected to the winding 52. Its base 102 is connected, via resistor 104, to the terminal 7 to which the positive source 5 is connected and, via capacitor 105, to the winding 32. The described connections to windings 32 and 52 are oriented so that an increase in the voltage on collector 101 is transformed from winding 52 to winding 32 to cause an increase in the voltage at base 102. The emitter 103 of transistor 100 is connected to the node 15 which is grounded.

Upon application of the positive source 5 to node 7, a positive voltage is transmitted, via resistor 104, to the base 102 of transistor 100 and to the capacitor 105. The input voltage applied to the capacitor 105 gradually builds up the voltage on the capacitor to a level sufficient to bias the transistor 100 into conduction. As current flows through the collector-emitter path of transistor 100, a voltage responsive to the current is generated in the two windings 51 and 52. Windings 51 and 52 are magnetically coupled to winding 32 as indicated by the dot notation shown in FIG. 1. Hence, the voltage induced in the winding 32 applies a positive voltage, via the capacitor 105, to the base 102 of the transistor 100. This positive voltage has a regenerative effect that drives the transistor 100 into saturation. The transistor 100 remains in a saturated conducting condition until the current generated in winding 32 builds up a reverse voltage on capacitor 105 which limits the current flow into the base 102 and transistor 100 drops out of saturation. The voltage across windings 51 and 52 collapses and the voltage induced in winding 32 drops driving base 102 negative biasing transistor 100 nonconducting. With proper selection of transformer characteristics for the transformer 50, its magnetic core will saturate during the blocking oscillator operation and not saturate during normal inverter operation. In this mode of operation the transistor 100 remains in a saturated conducting condition until the magnetic core of transformer 50 saturates. In response to this saturation, the polarity of the voltage across winding 32 is reversed and a negative blocking voltage is applied, via capacitor 105, to base 102 of transistor 100. This negative blocking voltage biases the transistor 100 into its nonconducting condition. If the blocking oscillator action is not inhibited as described below, the transistor 100 is biased into a conducting state again by the source voltage and the oscillating cycle is repeated.

The voltage across the bias winding 52 induced by the conduction of the saturated transistor 100 is utilized to turn transistor 10 into a conducting state. With transistor 10 conducting, the voltage at its base electrode assumes a negative polarity due to the voltage drop across winding 52. This negative voltage is coupled to the base 102 of transistor 100, via the diode 106, and serves to bias the transistor 100 nonconducting. This negative voltage is also stored on the capacitor 105 and also serves to keep the transistor 100 biased in a nonconducting condition during the continuous operation of the inverter. This action is continuous during the inverter oscillations since the capacitor 105 is recharged with a negative voltage every time the transistor 10 switches into conduction. If the inverter stops oscillating for any reason, the blocking oscillator transistor 100 will again be activated as described above. The blocking oscillator action continues to operate until the transistor 10 is biased into conduction and the inverter begins to oscillate.

Figure 2:
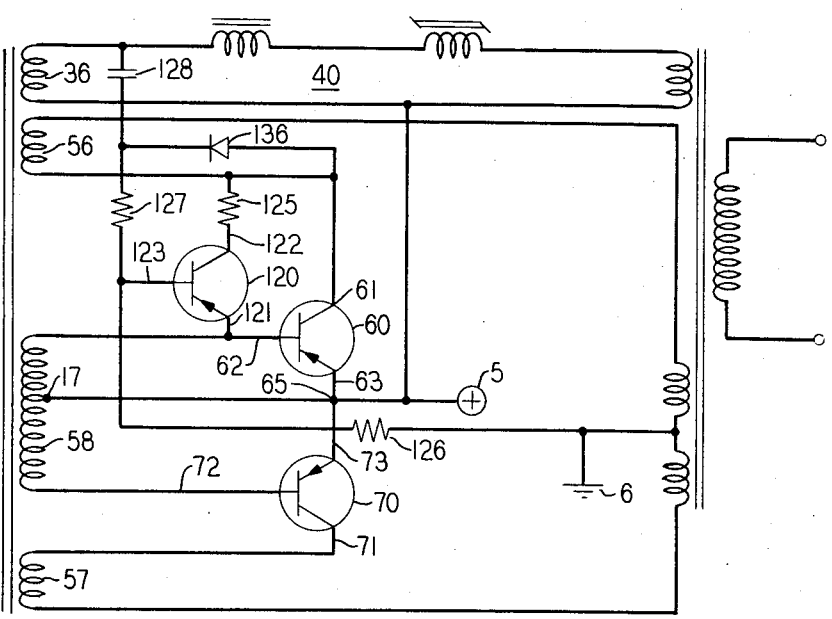
FIG. 2 shows a schematic of a common emitter connected transistorized inverter circuit also including a blocking oscillator starting circuit according to the principles of the invention.

A starting circuit according to the invention adapted for application to common emitter-connected inverter circuits is shown in FIG. 2. The feedback windings 56 and 57 are connected to the collectors 61 and 71 of the switching transistors 60 and 70, respectively. A third bias winding 58 couples the base electrodes 62 and 72. The bias winding 58 includes center tap 17 which is connected to the common junction 65 of the emitter electrodes 63 and 73. The common junction 65 is connected to the positive voltage source 5. The operation of the common emitter-connected inverter is similar to that of the common collector-connected inverter as described above and it is not believed necessary to describe it in detail.

The common emitter-connected inverter circuit in FIG. 2 includes a blocking oscillator transistor 120, which has its emitter 121 connected to the base 62 of transistor 60. Its collector 122 is connected, via a resistor 125, to the collector 61 and to the feedback winding 56. The base 123 is connected, via resistor 126, to the grounded terminal 6 and, via the series connected resistor 127 and capacitor 128, to the winding 36 in the frequency determining network 40.

The starting circuit in FIG. 2 operates in the same fashion as the starting circuit described with respect to FIG. 1 utilizing the regenerative feedback between windings 58 and 36. The resistors 125 and 127 are included in the base and collector circuits to prevent destruction of transistor 120 through overcurrent conditions should the inverter be inadvertently connected to a high voltage source. The diode 136 applies the inhibiting signal to the base 123 of transistor 120 once the inverter begins to oscillate.

It is apparent from the foregoing that by proper utilization of the feedback transformer of a current feedback type transformer an oscillator starting circuit may be included which is responsive to low voltage input and requires minimum of additional circuitry. Many other variations of this utilization of the feedback transformer as a starting circuit may readily be designed without departing from the spirit and scope of the invention.

What is claimed is:

1. An inverter circuit comprising an output transformer including first and second windings,
    a feedback transformer including first, second and third windings,
    first and second switching transistors having their collector electrodes joined at a common junction,
    first and second input terminals to accept a source of energy,
    said first input terminal connected to a center tap of said first winding of said output transformer and said second input terminal connected to the junction of the collector electrodes of said first and second switching transistors,
    said first winding of said output transformer having first and second terminals connected to said second and third windings of said feedback transformer, respectively,
    said second winding of said feedback transformer including a first terminal connected to the base electrode of said first switching transistor,
    said third winding of said feedback transformer including a first terminal connected to the base electrode of said second switching transistor,
    a frequency determining network including a saturable reactor and a linear inductance interconnecting the second winding of said output transformer and the first winding of said feedback transformer wherein the improvement comprises a third transistor having its base electrode connected to the said first input terminal to accept said source of energy,
    said third transistor having its collector electrode connected to said first terminal of said second winding of said feedback transformer and to the base electrode of said first switching transistor,
    the base electrode and collector electrode of said third transistor being connected to said first winding and said second winding of said feedback transformer, respectively, with an orientation so that an increase in the collector voltage of said third transistor is regeneratively transformed from said second winding of said feedback transformer to said first winding of said feedback transformer to increase the voltage applied to the base electrode of said third transistor whereby the regeneratively transformed voltage drives said third transistor into saturation and induces oscillatory switching action therein.

* * * * *